Feb. 20, 1934.    J. R. REYBURN    1,947,739
CHAIN CONNECTER
Filed May 11, 1932
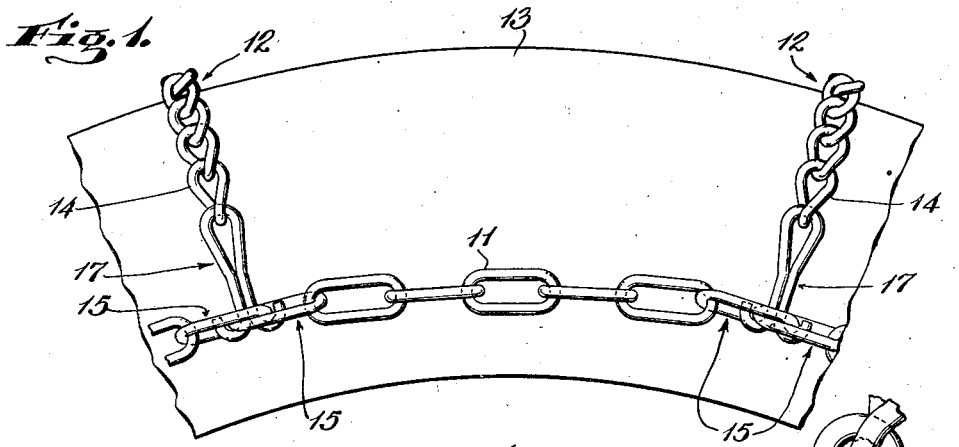
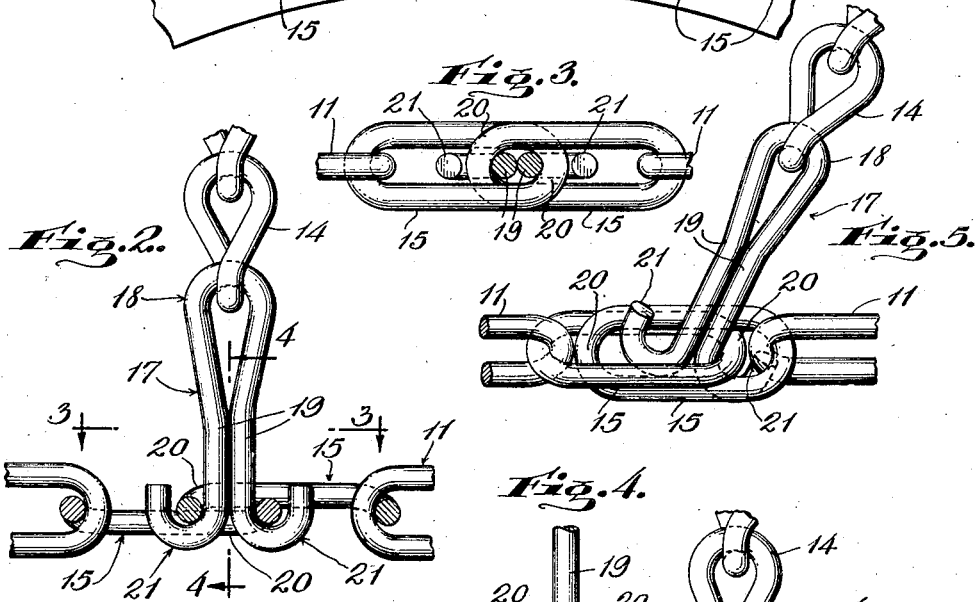
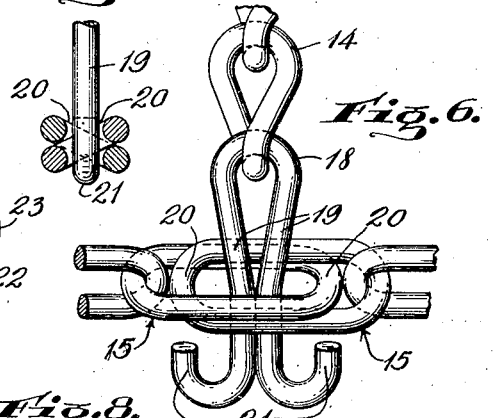
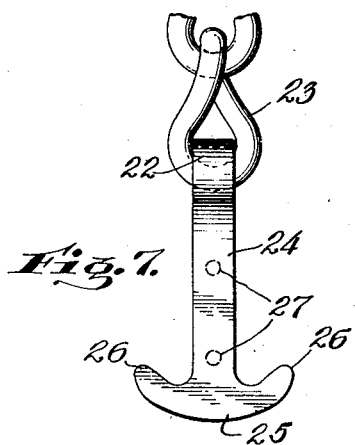
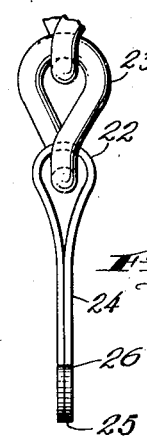
INVENTOR.
JOHN R. REYBURN
BY *[signature]*
ATTORNEY.

Patented Feb. 20, 1934

1,947,739

UNITED STATES PATENT OFFICE 1,947,739

CHAIN CONNECTER

John R. Reyburn, Fairfield, Conn., assignor to American Chain Company Inc., a corporation of New York Application May 11, 1932. Serial No. 610,599

4 Claims. (Cl. 152—14)

This invention relates to anti-skid tire chains of the type comprising side chains and cross-chains, and has for an object the provision of an attachment member which can be readily connected with a chain of the open link type, and can also be readily removed therefrom, by simple manipulation of the chain links and attachment member.

In pursuance of the invention, the attachment member is so constructed as to be adapted to transfix the adjacent overlapping end loops of two of the component connected links of the chain when the same are disposed in suitably registering position, the attachment member having a shank provided with a cross-head which serves to prevent displacement of the attachment member from the chain when the chain is under tension, or when the loop ends occupy positions respectively close to the shank of the attachment member so that they obstruct movement of the head through the overlapping loops.

Such attachment members are of particular utility when used to connect the ends of a cross-chain to the side chains of a conventional tire chain of the anti-skid type employed upon the tire of a vehicle wheel, for which purpose it is desirable to utilize attaching means that permits the user to detach broken or worn cross-chains readily from the side chains, and to insert fresh chains readily in place of the broken or worn chains, without the use of tools, and without forcing open or cutting any links or performing any mechanical operation other than the simple manipulation that the untrained user can exert with ordinary mechanical skill.

The attachment members are, however, capable of more general use, and accordingly every use is contemplated for which the members embodying the invention are adapted by the nature of the improvements herein disclosed.

The various features of the invention are illustrated and described fully in the accompanying drawing and specification, and are pointed out in the claims.

In the drawing,

Fig. 1 is a view in side elevation of part of a tire chain of the anti-skid type embodying cross-chains provided with attachment members made in accordance with the invention, and shown in combination with side chains applied to a vehicle tire.

Fig. 2 is a detail view in side elevation, on an enlarged scale, showing one of the attachment members of Fig. 1 with associated parts of a side chain, the connected portions of the chain links being shown partly in section.

Fig. 3 is a sectional plan view taken on the line 3—3 of Fig. 2.

Fig. 4 is a detail view in vertical section on the line 4—4 of Fig. 2.

Fig. 5 is a view similar to Fig. 2 showing the parts at an intermediate stage of the operation of applying the attachment member to, or removing it from, the side chain.

Fig. 6 is a similar view at another stage of said operation.

Figs. 7 and 8 are views in front elevation and side elevation respectively of a modification.

In a now-preferred embodiment of the invention illustrated in Figs. 1 to 6 inclusive, the part designated by the reference numeral 11 is a side chain of a conventional type employed in the fabrication of anti-skid tire chains for vehicle wheels, and the numerals 12 designate each of a plurality of twisted link cross-chains forming part of such a tire chain, extending across a tire 13 between, and connecting, the side chain 11 to a similar, or other suitable side chain (not shown) on the other side of the tire.

The side chains 11 and cross-chains 12 shown are of conventional type, but may be of any suitable structure. The side chains are formed of straight open wire links in the instance illustrated, and each cross chain 12 is shown as having an end link 14 connected with two adjacent connected links 15 of the side chain 11 by an attachment member 17 in the construction of which the invention has been embodied.

In making the attachment members 17 of a now-preferred form selected for illustration, a piece of wire is employed which has a body portion 18 bent to form a loop linked with the end link 14 of its cross-chain, and having its legs 19 extended side by side to form a shank of suitable dimensions to pass through the end loops 20 of the connected adjacent links 15, it being understood that such a connection of any attachment member embodying the invention may be effected with any connected pair of adjacent links of the side chain shown without alteration of their structure, so that the cross chains can be connected to the side chains at any suitable region thereof, at will.

In further pursuance of the invention, each attachment member has the ends 21 of its shanks bent to form projections which together constitute a cross-head adapted to prevent displacement of the attachment member from the side chain when the links 15 occupy a position with their end loops 20 closely adjacent to the shanks 19 of the attachment, as shown in Figs. 1 to 4, inclusive, this being the normal position in use, when the tire chain is in place upon a tire, with the side chains 11 and cross chains 12 stretched thereon in the position illustrated, under such tension as ordinarily exists, and which need only be enough to keep the links 15 snugly engaged with each other and with their end loops 20 snugly engaging the shanks 19.

When so applied, the cross-chains will remain connected with the side chains under all conditions ordinarily encountered in service, even though the tire chain may be applied somewhat loosely, as often occurs when chains are installed without the care which is desirable to secure best results in tractive and non-skidding effect and mileage.

The shank ends 21 are shown as forming approximately semi-circular head portions, and this is desirable, as it aids to insure a snug relationship between the connecting parts of the links and attachment member, but the exact form of the cross-head is not an indispensable part of the invention, so long as the head is of suitable shape to prevent unintended displacement of the attachment member from the side chain or other chain to which it is connected.

The particular shape of cross-head illustrated has been found to adapt the attachment member for ready application to the chain and detachment therefrom, whenever desired, by an operation involving a simple manipulation of the chain links 15 and the attachment member, which operation will now be described, special reference being had to Figs. 5 and 6, which show two typical stages of the operation, whether of application or detachment, one operation being obviously the reverse of the other.

In preparation for application of an attachment member, the two selected connected links 15 of the chain are first brought into substantially the overlapping relation shown in Fig. 5, with their end loops 20 spaced apart sufficiently to permit insertion of one of the end hooks 21 as shown in Fig. 5, and then the other end hook 21 will readily pass through the central opening of each link until both end hooks occupy the position shown in Fig. 6, clear of the links, after which the links 15 are drawn in opposite directions and the attachment member is drawn into the position shown in Figs. 1 to 4, this completing the installation of the cross-chain in combination with one side chain, a similar operation resulting in connection of the cross chain at its other end with the other side chain (not shown).

When any cross-chain is broken, or becomes worn, or is to be removed for repairs, or for any other purpose, the attachment member is brought by suitable manipulation from the position shown in Figs. 1 to 4 to that shown in Fig. 6, and is then canted over into the position shown in Fig. 5 and then can be readily withdrawn from the side chain, no alteration in structure of any character being necessary.

It is to be noted, as a valuable feature of the invention, that the action of the cross-head formed by the end hooks 21 and held by the overlapping links 15 of the side chain, is to hold the shanks 19 flat alongside the tire, so that the attachment member does not project as far from the side of the tire as is the case with connecting hooks or links of the conventional type, in which the end hooks are disposed at right angles to the plane occupied by the shanks at the region where they are bent around the side strand of the side chain to form attaching eyes.

Such eyes on a side chain travelling in a circumferential path are liable to cause serious effects when they enter into contact with such extending parts as the main springs, chassis frame, brake rods, etc., of a vehicle.

Accordingly, the clearance necessary to run a side chain is less with the improved form of attachment, both in the case of installations on single tires, and between the dual tires when a single chain is applied to the outer tire of the dual tires. For example, in the case of a tire chain applied to a seven inch pneumatic truck tire the cross-chain hook of conventional form measures 1¼ inches transversely across the eye which is closed about the side chain, while with the novel form of connection herein disclosed the space required for clearance between the tires is slightly less than the width of the side chain, inasmuch as the side chain links are thrown into a diagonal position with nothing extending transversely, and the corresponding over-all width is only seven-eighths of an inch.

Whereas it has been necessary to specify a clearance of two and one-half inches (i. e. double the transverse width of the hook) between the inner side wall of the tire and the chassis, where hooks of conventional form have been used, it is possible to run the new form of connection satisfactorily with as little as one and one-half inch clearance, so that with an over-all width of given maximum size, which is regulated by statute, it is possible to have a chassis two inches wider, as there is a saving in clearance of one inch at each side of the car.

For the above two reasons the new connection reduces substantially the clearance necessary to run a side chain.

It is to be noted also that the severest strains upon a cross-chain hook come when an automobile slides across car tracks with locked wheels, or across Belgian blocks with cross chains tending to catch in crevices. Under these conditions, conventional cross chain hooks tend to open up. As a result the size of wire in conventional cross chain hooks has been increased, with resultant increase in cost and weight.

When, however, similar stress occurs upon connections of the new form, the two side chain links encircling the shanks of the attachment member tighten up and afford a firm grip, assisting to prevent the shank from pulling out.

Under the same conditions, a cross chain tends to rotate, and this twisting strain, on reaching the eyes of conventional cross chain hooks, tends to open them, but in the case of the new connection twist is taken up by the side chain links themselves and there is no tendency to displace the extreme ends of the attaching members.

Accordingly, it is possible to use lighter wire in making the new attachment members for a given type of service.

Various modifications may be made within the scope of the invention.

For example, instead of making the attachment member of wire, it may be formed conveniently of sheet metal stamped out in a blank of double anchor form and folded over to form the device shown in Figs. 7 and 8, a loop 22 serving for connection to the end link 23 of a cross chain, while the flukes 26 of the anchor shaped head 25 serve the same purpose as the end hooks 21 of the wire device already described, the double intermediate shank portions 24 being preferably secured together by spot-welding, as indicated at 27, or otherwise metallically united to form a strong structure.

I claim:

1. The combination with a chain having interconnected open links, of an attachment comprising a member having a shank provided with a head adapted to pass through both of the overlapped end loops of two adjoining links of said chain, said head acting to prevent displacement of said member from the chain when said end loops occupy a position closely adjacent to each other and to said shank.

2. The combination with a chain having interconnected open links, of an attachment comprising a member having a shank provided with a head adapted to pass through both of the overlapped end loops of two adjoining links of said chain, said head acting to prevent displacement of said member from the chain when said end loops occupy a position closely adjacent to each other and to said shank, the free end of said shank being provided with means by which said attachment member may be secured to an article for attachment to said chain.

3. In a tire-chain, the combination with a side chain and a cross-chain, of a connecter having a shank portion one end of which is connected with said cross-chain and the other end of which has a transversely extending head, said shank portion extending through both of the end loops of two connected links of the side-chain so that when the side chain is under tension the head portion of said shank prevents disconnection of said connecter from said links, said head being of suitable shape to permit free removal thereof through said end loops by manipulation of said connected links and connecter member.

4. In a tire-chain, the combination with a side-chain and a cross-chain, of a connecter having a shank portion one end of which is connected with said cross-chain and the other end of which has a transversely extending head, said shank portion extending through both of the end loops of two connected links of the side-chain so that when the side-chain is under tension the head portion of said shank prevents disconnection of said connecter from said links, said head being of anchor shape to permit free removal thereof through said end loops by manipulation of said connected links and connecter member.

JOHN R. REYBURN.